United States Patent Office 3,158,678
Patented Nov. 24, 1964

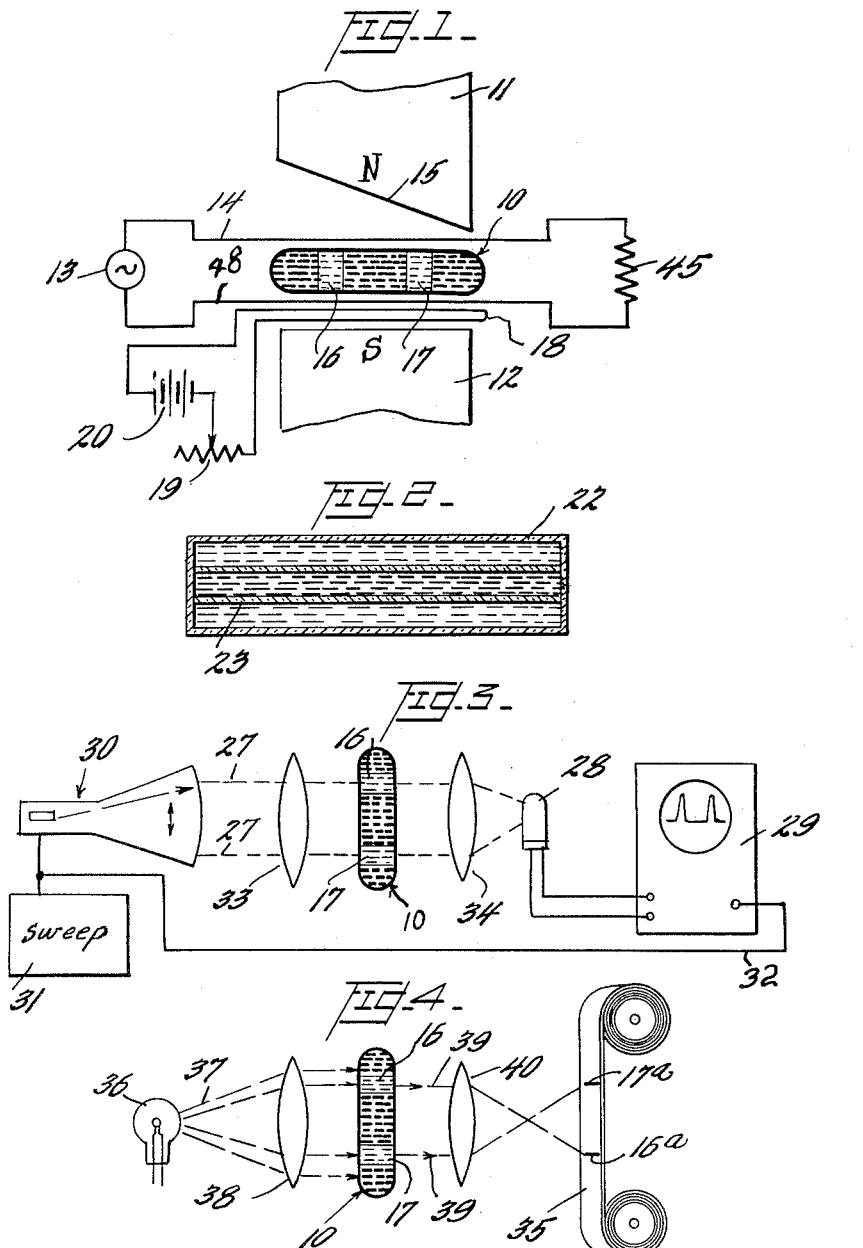

3,158,678
OPTICAL DEVICE
Harold C. Anderson, Silver Spring, Md., assignor to Litton Systems, Inc., College Park, Md.
Filed June 20, 1961, Ser. No. 118,407
25 Claims. (Cl. 88—61)

This invention generally relates to the control of light by means of radiant electromagnetic beams for such applications as radio controlled light valves, radio beam detectors, optical amplifiers and many others, and is particularly concerned with providing an optical device whose transparency to light may be controllably varied in response to radiant electromagnetic beams at other than light frequencies.

In an earlier application of the same assignee, Serial No. 59,342, filed Sept. 29, 1960, there is disclosed a number of processes employing spin resonance materials that are adapted to absorb radiant electromagnetic beams such as microwave radio beams, and convert the energy being absorbed into the form of heat. According to the preferred processes, such materials may be tuned or rendered frequency selective to different frequency radio beams by the application of intense static magnetic fields whereby the processes may be employed to produce heat images or patterns of a time variable radio beam for such purposes as directly recording the radio beam.

According to the present invention, it has been found that the degree of optical transparency of certain mixtures of substances may be controllably varied according to the temperature of the mixture, and more specifically, it has been noted that certain such mixtures have a critical temperature above which the mixture is substantially transparent to light but below which the mixture is rendered substantially opaque.

According to the present invention, there is provided a combination of these two phenomena wherein an electromagnetic beam absorbing material is intimately combined in heat transferring relationship to a heat responsive variable transparency mixture of substances. By this combination the radiant electromagnetic beam is sequentially converted into two different forms. In the first form, the beam is converted into a heat image or pattern being related to the frequency or frequencies of the beam, and in the second conversion this heat image obtained is further converted into a change in the light transparency of a mixture of materials.

It is designed to merely observe or record the change in light transparency, a light image may be formed by optical projection or reflection and such image may be displayed or photographed, as may be desired. On the other hand, due to the fact that the end image obtained is in the form of a variable light transparency, it may be employed to control greater intensities of light to provide optical amplification for a wide variety of communication or control purposes.

It is accordingly a principal object of the invention to provide an optical device whose transparency to light is controllably varied according to a radiant electromagnetic beam, such as a radio beam.

A further object is to provide such an optical device that may be rendered frequency selective to different frequencies of the radiant beam to produce an optical image.

A still further object is to provide such a device that may be employed to amplify the energy of the radiant beam as well as convert the beam into optical form.

Still another object is to provide a converter for the above purposes that is useful for operation in the microwave range of radio frequencies.

Other objects and additional advantages will be more readily understood by those skilled in the art after detailed considerations of the following specification taken with the accompanying drawings wherein:

FIG. 1 is a cross sectional view illustrating one application of the invention for radio frequency beam measuring and indication purposes.

FIG. 2 is a perspective view illustrating a construction for combining the optically variable mixture with heat producing materials in heat transferring relationship.

FIG. 3 is a cross sectional view of an apparatus for detecting and displaying the optical image obtained according to the invention.

FIG. 4 is a cross sectional view illustrating an apparatus for recording the optical image obtained on a photographic film.

Referring now to the drawings and initially to FIG. 1, for a detailed consideration of the invention and some of its various applications, there is schematically shown in FIG. 1, an optical device for detecting and indicating the different frequency components of a radiant microwave radio beam.

As shown, there is initially provided an elongated, hollow sealed capsule or housing 10, which may be generally tubularly shaped as indicated and formed of glass or other optically transparent material. The tube 10 is adapted to contain a mixture of substances that are mutually soluble and optically transparent above a critical temperature and substantially insoluble and optically opaque below this critical temperature.

In addition to this mixture of substances there is also provided within the tube 10 a material that is sensitive to radiant electromagnetic waves, such as a stable free radical material or other such spin resonance material as discussed in the copending application mentioned above. Such materials are characterized by the ability to absorb energy from a radiant radio beam and convert the energy absorbed into heat.

According to the first embodiment of the invention, the radiant beam responsive material and the heat responsive mixtures of substances are selected to be mutually compatible with one another and may be intimately combined with one another within the same transparent tube 10. Thus upon the tube 10 being normally maintained at a temperature just below critical temperature and being subjected to a radiant radio beam, the added heat being produced by the beam absorbing material raises the temperature of the mixture from a condition that is opaque to light to a condition transparent to light. In this manner, the tube 10 and its contents function to detect and to indicate, by a change in light transparency, the presence of the radio beam.

According to this first embodiment of the invention it is desired that this optical device function to detect and individually indicate the different frequency components of the radio beam being produced by a radio frequency source 13. To perform this function, the tube 10 is placed in the radiant field being produced between the conductors 14 and 48 which form a transmission line leading from the source 13. In this manner the tube 10 is uniformly illuminated by the radio beam produced by the source 13.

To render the device frequency sensitive, the tube 10 is also subjected to a nonlinear static magnetic field along its length by such means as being placed between the opposing magnetic poles 11 and 12 of a suitable magnet with at least one of the magnet poles 11 having an outwardly inclined pole face 15 diverging away from the tube 10 along its length to provide a progressively increasing air gap between the magnet poles 11 and 12 along the length of the tube 10. This magnet construction produces a nonuniform static magnetic field along the length of the tube 10 thereby subjecting the radiant beam absorbing material within the tube to different magnetic field intensities, with the material at the right end of the tube receiving the highest intensity magnetic field and the material at other positions within the tube from right to left receiving a progressively lower intensity magnetic field.

One of the characteristics of the preferred radiant beam absorbing material within the tube 10 is its frequency selectivity or sensitivity to different frequencies of the radio beam in proportion to the strength of the static magnetic field energizing the tube 10. As a result, the nonuniform magnetic field produced along the length of the tube 10 renders each incremental area of absorbing material along this length responsive only to a different frequency of the radio beam produced by the source 13. Thus by the provision of a nonuniform magnetic field the sensitive material within the tube 10 responds to the radio beam of source 13 to produce a variable heat image along the length of the tube corresponding to the different frequency components of the beam.

This heat being produced at the different incremental areas along the tube is transferred to the optically variable mixture of substances at that area to raise the temperature thereof above its critical temperature and render that area of the tube transparent to light, as generally indicated at areas 16 and 17 in FIG. 1. As a result, the device functions to separate the various frequency components of the radio beam and absorb each different frequency component at a different position along the length of the tube 10 thereby to render that position transparent to light. Thus, the tube 10 functions to not only detect the radio beam but additionally provides a variable transparency pattern along the length of the tube indicating the different frequency components of the radio beam.

Since the indication being obtained is in the form of a variable light transparency image, the tube 10 may be employed in a light projection and amplifying system, as generally indicated in FIGS. 3 and 4 to intensify or enlarge the image for recording, display or other purposes. In amplification applications, the radio beam from source 13 being produced at a relatively low power level controls the transmission of light at a considerably higher level of intensity.

A more detailed example of the device of FIG. 1 may serve to further clarify its mode of operation. Assuming that it is desired to detect and indicate a radio beam from source 13 having two unknown frequency components, being in the range of 50 to 60 kilomegacycles, the static magnetic field being produced by magnet poles 11 and 12 would be provided to uniformly vary in intensity from about 17 kilogauss at the left end of the tube 10 to about 22 kilogauss at the right hand end thereof. Presupposing that the microwave beam absorbing material within the tube 10 is comprised of a stable free radical material, then at position 16 of the tube 10, the material is tuned by the magnetic field to selectively absorb a radio frequency of 53.2 kilomegacycles whereas at position 17, the material will selectively absorb only a radio frequency of 56 kilomegacycles. Presupposing that the two unknown frequency components from source 13 are at 53.2 kilomegacycles and 56 kilomegacycles, then these two frequencies are selectively absorbed at positions 16 and 17, respectively, to raise the temperature at these positions along the tube 10 above critical temperature so that the mixtures of substances in the tube at these positions only become transparent whereas this mixture at other positions along the tube remains opaque.

Since the intensity of the static magnetic field at each position along the tube determines the frequency that will be absorbed according to the Zeeman energy relationship, the occurrence of the light transparency at the positions 16 and 17 clearly indicates that the two component frequencies from the source 13 are at 53.2 kilomegacycles and 56 kilomegacycles, respectively.

A number of different spin resonance materials and optically variable mixtures may be employed in practicing the invention.

Particular mixtures of heat sensitive substances which are considered as having special utility according to the invention include the mixture of tri-cresyl phosphate and di-ethylene glycol, and the mixture of tri-cresyl phosphate and propylene glycol. Both of these mixtures exhibit critical temperatures of mutual solution lying within a range of about 58 degrees centigrade to about 74 degrees centigrade, depending upon the proportions of these ingredients in the mixture. When the substances are combined in approximately equal molecular proportions satisfactory results are obtained.

Other mixtures of substances which may be employed include aniline and water; phenol and water; nicotine and water; aqueous potassium carbonate and aqueous ammonia; methyl ethyl ketone and water, with each containing a small amount of ethanol; methyl alcohol and cyclohexane; and ethyl alcohol and succinonitrile. Each of these latter mixtures exhibit substantially the same optical heat properties as the first named mixtures mentioned above and will normally provide satisfactory results when mixed in equal molecular proportions.

In these mixtures, it has been observed that at temperatures below their critical temperature of solution, the substances are ordinarily in undissolved condition and tend to form a suspension of one substance in the other. In this condition, the mixture provides an opaque or light scattering medium due to the differences in the indices of light refraction of the interspersed liquid or solid particles. This light scattering effect abruptly disappears as soon as the mixture is heated above the critical temperature when the suspended particles go into mutual solution whereby the mixture abruptly changes from a substantially opaque medium to a transparent medium. This transformation is also abruptly reversible in the same manner as the mixture is cooled below its critical temperature.

To obtain the desired sensitivity of operation, the heat sensitive mixture of substances is preferably maintained at a temperature just below its critical temperature whereby upon the addition of a small amount of heat, the opaque medium is rapidly rendered transparent. As schematically shown in FIG. 1, this may be performed by placing an electrically energized heating wire 18 in proximity to the tube 10 together with a suitable temperature regulating means such as a variable resistor 19 being series connected between the electrical battery 20 or other source and the heating wire 18. By adjusting the valve of resistor 18, the temperature of the wire 18 is varied enabling an adjustment of the temperature of the contents of the tube 10.

A number of different radiant electromagnetic beam absorbing materials are also known which may be combined with the above mentioned mixtures to heat the mixture in response to the radiant beams in the manner described. One suitable radio beam absorbing material having these characteristics is a stable free radical obtained by a basic alcohol solution of ethyl alcohol, succinonitrile and 1,4,naphthosemiquinone. Another suitable stable free radical solution is obtained from a solution of anthracene dissolved in concentrated sulphuric acid. Still other free radical materials and other types of spin resonance materials possessing these characteristics are set forth in the earlier copending applications cited above.

In some instances, the radio beam absorptive material is not compatible with the heat sensitive mixture of substances and cannot be directly combined with this mixture within the same tube 10. One example of this is the free radical solution of anthracene dissolved in concentrated sulphuric acid, which free radical cannot be directly combined with the heat sensitive mixture of aqueous potassium carbonate and aqueous ammonia, above referred to. However, according to the invention, such noncompatible ingredients may be nevertheless combined in heat transferring relationship by other means as is generally illustrated in FIG. 2.

As shown in FIG. 2 the radiant beam sensitive material may be enclosed within an outer closed transparent cylinder 22 or other sealed container, and the heat sensitive mixture of substances may be separately enclosed within an inner closed transparent container 23 that is coaxially disposed within the outer container 22. In this modification the ingredients are intimately combined in mutual heat transferring relationship yet physically separated from one another. As is believed evident, the reverse of FIG. 2 may also be employed wherein the heat sensitive mixture is separately housed within the outer sealed container and the radiant beam responsive material is disposed within the closed inner container. Many other configurations are also easily obtained for combining these ingredients in mutual heat transferring relationship without intimately mixing the ingredients.

The change in optical properties of the mixture may be observed, displayed, or recorded in a number of different manners. In FIG. 3 there is shown a densometer arrangement for scanning the tube 10 by a light beam to record or display the pattern or image of the variable optical transparency obtained. As shown in FIG. 3, a flying light spot scanner may be employed to rapidly sweep a light spot over the surface of the tube 10. At those elemental areas 16 and 17 of the tube 10 that are transparent, the light spot is passed through the tube 10 to be received by a phototube 28 on the opposite side thereof which converts the light into an electrical signal or series of pulses for transmission to an oscilloscope 29 or other display or control device, as desired. This system, therefore, converts the varaible transparency pattern into an electrical pulse code.

In greater detail, the flying spot scanner may be comprised of a conventional cathode ray beam tube 30 whose scanning rate is controlled by a conventional sweep circuit 31 as well known in the art. The sweep signal may also be directed over line 32 leading to the oscilloscope 29 thereby to synchronize the receiver means with the scanning means. For focusing the light beam before and after the tube 10, a pair of optical lenses 33 and 34 may be employed as shown.

FIG. 4 illustrates one manner of recording the variable optical pattern on a photographic film 35. In this embodiment, a source of light 36 projects light rays 37 over the entire face of the tube 10, by means of a suitable lens 38 or the like. The light rays 39 passing through the transparent image portions of the tube 10 are projected through a suitable lens system 40 to form an optical image of the variable transparency pattern of tube 10 on the photographic film 35.

In both embodiments of FIGS. 3 and 4, the tube 10 and its contents basically function as a variable light valve in response to the radiant electromagnetic beam whereby the light output may be greatly intensified or amplified over the control energy received from the radiant electromagnetic beam.

It is to be particularly noted that according to the present invention, the optical device may function in response to a wide range of different frequencies in the radio frequency and microwave bandwidths and that the terms "radio beam" and "radiant electromagnetic beams" are intended to encompass this wide range of frequencies but to be distinguished from the term "light" whose wavelengths occur in a far different range of shorter magnitudes than do the radio wavelengths. It is also to be noted, that the invention is not limited to providing an optical image having but one variable dimension, such as the variable pattern being produced along the length of the tube 10 in FIGS. 1 and 3, but on the contrary, a multidimensional optical pattern may be produced for such purposes as television display or the like.

This latter display may be obtained in one form by employing a two dimensional capsule or container having extended width and length dimensions and providing a two dimensional nonuniform magnetic field over said capsule. Since these and many other modifications may be made by those skilled in the art without departing from the spirit and scope of the invention, this invention is to be considered as limited only according to the following claims appended hereto.

What is claimed is:

1. A light controlling device responsive to radio frequency beams comprising a mixture of substances that is transparent to light above a critical temperature, and relatively opaque below said critical temperature, means for heating said mixture above its critical temperature in response to a radiant microwave radio beam, said means including a radio frequency absorbing material in proximity to said mixture to absorb energy from said microwave radio beam thereby to produce heat and transfer the heat to said mixture.

2. In the device of claim 1 said mixture being supported to occupy an extended region and said material being intimately combined in contact with said mixture.

3. In the device of claim 1 said mixture being supported to occupy an extended region and said material being supported in heat transferring relationship with said mixture but not in contact therewith.

4. In the device of claim 1 said mixture being supported to occupy an extended region and said material being dispersed over said region in heat transferring relationship to said mixture, and means for rendering different elemental areas of said material selectively responsive to difference frequencies of the microwave beam to produce a spectral heat image over said region corresponding to the frequencies of the beam.

5. In a process for converting a time variable electromagnetic radio frequency beam into a spatial image of radiant energy at a different order bandwidth of frequency, the steps of detecting the radio beam and converting the energy into a spatially dispersed heat pattern, applying the heat pattern to a dispersed mixture of substances characterized by having a critical temperature below which the mixture is substantially opaque to a different frequency radiant beam and above which the mixture is substantially transparent to said different frequency band radiant beam, and illuminating the mixture with the different frequency radiant beam whereby the mixture transmits the different frequency radiant beam in a spatial pattern corresponding to the heat pattern.

6. A light controlling device comprising, a microwave beam absorbing material supported over an extended region, means subjecting the material to a static magnetic field of sufficient intensity to render the material absorptive to a microwave radio beam to convert the energy absorbed into heat, a substance having a critical temperature below which it is substantially opaque to light and above which it is substantially transparent to light, and means for maintaining the material in heat transferring relationship with the substance.

7. In the device of claim 6, said magnetic field being nonuniform over said material to render different elemental areas of said material selectively absorptive to different microwave frequencies thereby to produce a spectral heat image corresponding to the component frequencies of the beam.

8. In the device of claim 6, said material being mixed with said substance.

9. In the device of claim 6, said material being supported out of contact with said substance but in heat transferring relationship thereto.

10. In a light controlling device, a mixture of substances having a critical temperature of mutual solution and being substantially opaque to light below such temperature and transparent above such temperature, means supporting the mixture so that it presents an extended surface to impinging light, and means for controllably varying the temperature of elemental areas of said surface above and below such critical temperature according to different frequencies of an invisible microwave beam, said means including a frequency sensitive microwave absorbing material being supported in heat transferring relationship to said substance along said extended surface with different elemental areas of said material being selectively responsive to different frequencies of the invisible microwave beam.

11. In the device of claim 10 said material being combined in contact with said mixture of substances.

12. In the device of claim 10 said material being supported in heat transferring relation to said mixture but not in contact therewith.

13. In the device of claim 10 said mixture of substance being supported within a transparent container and said material being supported within a separate transparent container.

14. In the device of claim 10, said material being supported coextensively with said extended surface with different elemental areas thereof in heat transferring relation to different elemental areas of said mixture, and means for maintaining the temperature of said mixture immediately below the critical temperature.

15. In the device of claim 10, means for conditioning the different elemental areas of said material to selectively respond to different frequencies, said means including a magnet for subjecting said material to a nonuniform static magnetic field.

16. In a light valve responsive to a radiant microwave beam, a spin resonant material supported over an extended region, means producing a magnetic field over said region to tune said material into energy absorbing relationship with said radiant microwave beam, thereby to absorb energy from the beam and convert the energy absorbed into heat, an optically variable means responsive to the heat being produced for varying its degree of light transparency, and means for illuminating said optically variable means by a light beam whereby the light passing said variable means is controlled by said radiant microwave beam.

17. In the light valve of claim 16, said optically variable means including a mixture of substances having a critical temperature of mutual solution, and means for maintaining said mixture at a temperature just below its critical temperature whereby the heat being produced in said spin resonance material controllably varies the temperature of said mixture through a range which includes the critical temperature to produce variations in the optical properties of the mixture.

18. An article of manufacture comprising a mixture of two substances having a critical temperature of mutual solution, the optical properties of the mixture being variable with the degree of mutual solubility of the substances, and a material responsive to radiant electromagnetic waves at radio frequencies for producing heat, said material being supported in heat transferring relationship to said mixture.

19. In the article of claim 18, said material being combined in direct contact with said mixture of substances.

20. In the article of claim 18, said material being supported in heat transferring relationship with said mixture but not in intimate physical contact therewith.

21. A light controlling device responsive to radiant electromagnetic beams at radio frequencies comprising a mixture of two substances having a critical temperature of mutual solution, and occupying an extended region, said mixture being relatively insoluble and opaque to light at temperatures below said critical temperature and being soluble and transparent to light at temperatures above said critical temperature, a material responsive to said radio frequency radiant beam for absorbing energy from the beam and converting the absorbed energy into heat, said material being maintained in heat transferring relation to said substance whereby upon said material being illuminated by said beam a heat pattern is formed and applied to said mixture rendering said mixture transparent.

22. In the light valve of claim 15, said magnetic field being nonuniform over said region to tune elemental areas of said material to different frequencies of the microwave beam.

23. A process for converting an invisible beam of radiant energy containing different frequency components into a spatially dispersed pattern of visible light, which pattern corresponds to the frequency components in the beam, comprising the steps of dispersing a radiant beam responsive material over a given region, tuning different spatial positions of said material into selective energy absorptive relationship with different frequencies of said beam thereby to produce a spatially dispersed heat pattern corresponding to the different frequencies of the beam, dispersing a heat responsive substance in heat transfer relationship to said material over said region, said substance being characterized by changing its optical characteristics responsively to heat, and illuminating said substance with visible light and said material with said invisible beam.

24. A process for converting a radio frequency beam into an optical light pattern comprising the steps of applying the radio beam to a beam absorptive material characterized by producing heat when subjected to the beam, applying a visible light beam to a heat responsive substance characterized by variation of its optical properties when exposed to heat, and maintaining said material and substance in heat transferring relationship, whereby the radio beam is converted into a heat pattern by said material and the heat pattern is transferred to the substance to vary its optical properties which in turn modifies the visible light applied thereto.

25. In the process of claim 24, the further step of tuning different portions of said material to respond to different frequencies of the radio beam thereby to produce a frequency spectrum heat pattern in said material.

References Cited by the Examiner

UNITED STATES PATENTS

| | | | |
|---|---|---|---|
| 1,963,496 | 6/34 | Land | 88—61 |
| 2,050,608 | 8/36 | Hellige | 88—14 |
| 2,281,637 | 5/42 | Sukumlyn | 88—106 |
| 2,710,274 | 6/55 | Kuehl | 88—61 |
| 2,824,235 | 2/58 | Hahn et al. | 88—61 |
| 3,085,469 | 4/63 | Carlson | 88—106 |

FOREIGN PATENTS

| | | |
|---|---|---|
| 1,218,574 | 12/59 | France. |
| 702,000 | 1/54 | Great Britain. |

JEWELL H. PEDERSEN, *Primary Examiner.*

EMIL G. ANDERSON, *Examiner.*